Figure 1:
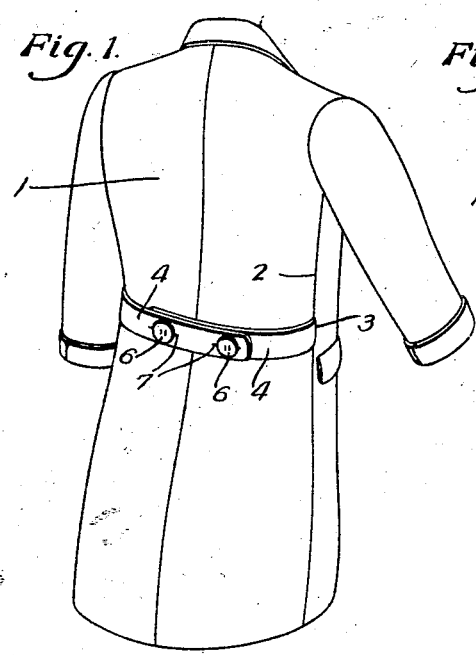

Oct. 9, 1928.

A. A. SIEGEL 1,686,577

COAT

Filed April 20, 1927

INVENTOR
*Abraham A. Siegel.*
BY
ATTORNEYS

Patented Oct. 9, 1928.

1,686,577

UNITED STATES PATENT OFFICE.

ABRAHAM A. SIEGEL, OF NEW YORK, N. Y., ASSIGNOR TO DAVID SIEGEL, OF NEW YORK, N. Y.

COAT.

Application filed April 20, 1927. Serial No. 185,196.

The main object of the invention is to provide a coat with an attached belt, the coat and the belt being so designed and arranged that the belt may be worn outside of and around the back of the coat when it is desired to have a belted coat; and may be secured wholly within the coat when it is desired to have the coat with a straight, full back.

Figure 2:
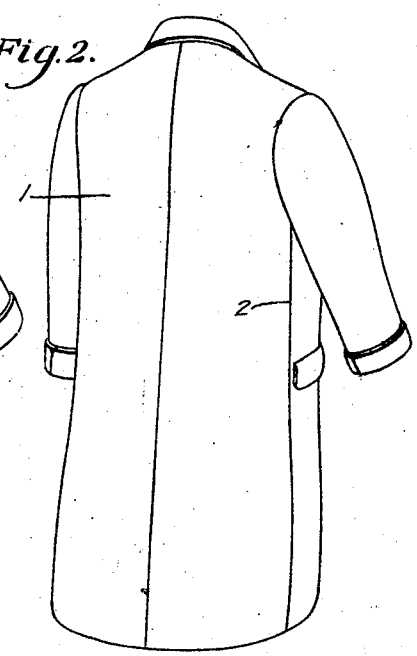
Figure 3:
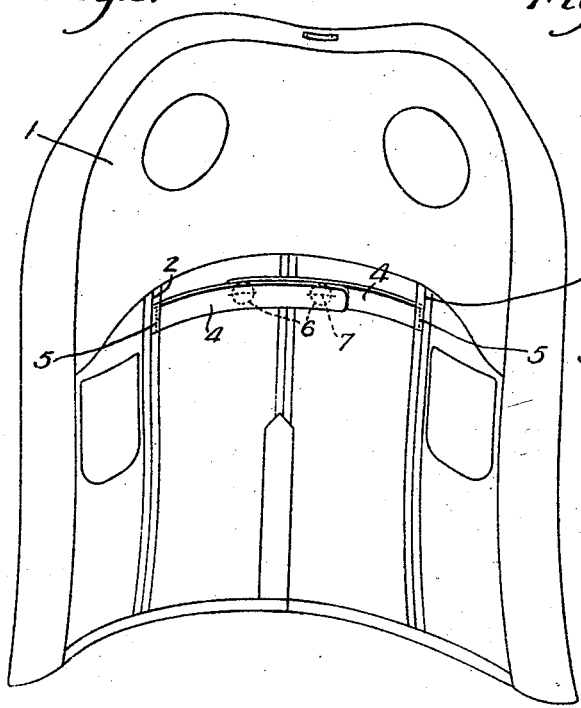
Figure 4:
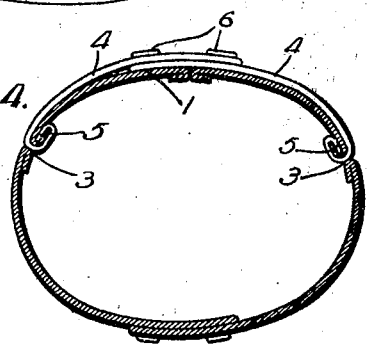
Figure 5:
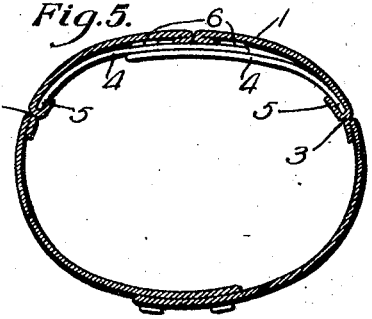

In the drawings:

Fig. 1 is a view of the coat showing the belt in position around the back thereof;

Fig. 2 a similar view of a coat without the belt appearing on the outer side;

Fig. 3 a view of the inner side of the coat showing the belt arranged wholly on the inner side thereof;

Fig. 4 a horizontal, transverse, sectional view of the coat with the belt arranged as shown in Fig. 1; and Fig. 5 a view similar to Fig. 4 showing the belt arranged as illustrated in Fig. 3.

Referring to the various parts by numerals 1 designates the body of the coat which is formed with the usual side seams 2. These seams are usually under the sleeves. A portion of each of these seams is left open to form slits or openings 3 at about the waist line of the coat; the slits are preferably at opposite sides of the coat and are formed in the side seams so that they will be under the sleeves, that is to say, they would ordinarily be covered and concealed by the sleeves. The edges of the material along the seams and the slits therein are turned in and finished in any suitable manner and the edges of the slits fit close together so that the slits are not evident to the ordinary observer.

Within the coat and forward of the slits 3 are secured two belt members 4, each member being stitched at its forward end to the inner side of the coat in line with the adjacent slit, as at 5. The inner ends of the belt members are preferably turned in and sewed within the seams 2 as shown in Figs. 4 and 5. It will be understood that these ends may be secured within the coat in any suitable manner. The free ends of the belt members are provided with means for connecting them together, the means shown comprising buttons 6 on one member and buttonholes 7 in the other member. Any suitable fastening means may be used for connecting together the ends of the belt members.

When it is desired to wear the coat with a belt effect, the belt members are passed outwardly through the slits, carried around the back of the coat and the free ends connected together, as shown in Figs. 1 and 4. When it is desired to wear the coat with a straight, back effect without the belt, the belt members are withdrawn from the slits 3 and their free ends are connected together within the coat and around the back part thereof as shown in Figs. 2, 3, and 5.

The slits or openings 3 serve as means for holding the belt in position and at the proper height at the waist line of the coat and prevent the belt sagging at the sides of the coat. The button and button-hole fastening means serve as means for securing the belt in position both outside and inside of the coat.

What I claim is:

1. A convertible coat comprising a body part provided with slits or openings at opposite sides thereof under the sleeves; two belt members secured within the coat one of said members being attached to the inner side of the coat adjacent each slit, and adapted to be passed outwardly through the said adjacent slit and around the back of the coat; and means for fastening the free ends of the belt members together, whereby the belt members may be secured together at the back of the coat at the outer side thereof after they are passed outwardly through the slits, and may be secured together within the coat and at the back thereof when not passed outwardly through the slits.

2. A convertible coat comprising a body part provided with slits or openings at separated points substantially at the waist line thereof; two belt members secured within the coat one of said members being attached to the inner side of the coat adjacent each slit, and adapted to be passed outwardly through the said adjacent slit and around a portion of the coat; and means for fastening the free ends of the belt members together, whereby the belt members may be secured together outside of the coat after they are passed outwardly through the slits, and may be secured together within the coat when not passed outwarly through the slits.

3. A convertible overcoat comprising a body part formed of front and back sections folded inwardly along their opposed edges and stitched together to form two seams extending downward from the armholes, the stitching of said seams being omitted for a short space in each seam to provide two slits at opposite sides of the coat substantially at the waist line thereof between the opposed inwardly folded edges of the said sections; a belt fastened to the inner side of the coat and adapted to extend outward through the slits and around the back of the coat when a belted coat is desired and to be withdrawn from the slits and lie entirely within the coat when an unbelted coat is desired; and means for fastening the belt in either position, whereby the coat may be converted to either style without reversing it, and the slits will be closed and invisible when the belt is entirely within the coat.

4. A convertible overcoat comprising a body part formed of front and back sections folded inwardly along their opposed edges and stitched together to form two seams extending downward from the armholes, the stitching of said seams being omitted for a short space in each seam to provide two slits at opposite sides of the coat substantially at the waist line thereof between the opposed inwardly folded edges of the said sections; two belt members secured within the coat, one of said members being attached to the inner side of the coat adjacent each slit and adapted to be passed outwardly through said adjacent slit and around the back of the coat; and means for fastening the free ends of the belt members together, whereby the belt members may be secured together outside of the coat after they are passed outwardly through said slits, and may be secured together and lie entirely within the coat when not passed outwardly through said slits, and the slits will be closed and invisible when the belt is entirely within the coat.

In testimony whereof I hereunto affix my signature.

ABRAHAM A. SIEGEL.